June 25, 1968   W. F. ENGLAND   3,390,312
METALLIZED FILM CAPACITOR
Filed March 3, 1967

United States Patent Office 3,390,312
Patented June 25, 1968

3,390,312
METALLIZED FILM CAPACITOR
Walter F. England, Williamstown, Mass., assignor to Sprague Electric Company, a corporation of Massachusetts
Filed Mar. 3, 1967, Ser. No. 620,338
2 Claims. (Cl. 317—260)

ABSTRACT OF THE DISCLOSURE

Convolutely wound metallized films are transversely disposed within a convolute winding with extended portions of each film folded back into alternate ends of the winding so as to encompass and insulate the edge portion of an adjoining turn of opposite polarity and to provide contact of the metallizing on the outside of the fold to that of the next adjacent turn of the same polariy.

Background of the invention

This invention relates to metallized film capacitors and more particularly to metallized film capacitors having extended foil construction.

In the prior art, metallized film capacitors have many advantages; however, external connection to the thin electrode surfaces continues to be a problem. One solution has been the use of extended foil construction. In this, each film is extended from alternate ends of the section, and contact is made to the extended portion by low temperature solder, or the like. Unfortunately, this arrangement provides a very limited contact area and is subject to arcing and shorting between electrodes of opposite polarity, in the contact area.

One means, employed to increase this contact area, has been to bend over, or fold back, the extended portions so as to expose more of the metallized surface. In this case, however, the conductive area along the folded edge is exposed to the conductive surface of the adjoining turn of opposite polarity, with the result that arcing and shorting occurs.

Summary of the invention

Broadly, a metallized thin film capacitor provided in accordance with the invention comprises a pair of metallized dielectric films transversely disposed in a convolute winding with portions extended from alternate ends of the winding being folded back into it, so as to encompass the edge portion of an adjoining turn of opposite polarity. The conductive surface on the outside of the folded back portion contacts the conductive surface of an adjacent turn of the same polarity while the dielectric layer, on the inside of the fold, insulates the folded electrode surface from the encompassed film of opposite polarity.

Thus, each extended film encompasses the edge of the adjoining turn of opposite polarity so as to shield the latter from external contact and to insulate it from the conductive surface of opposite polarity. Accordingly, this construction controls the transverse spacing of the films within the winding and insulates the metallized areas of different polarity at each end of the convolutely wound section and provides large surfaces for external contact.

Description of the preferred embodiments

Figure 1:
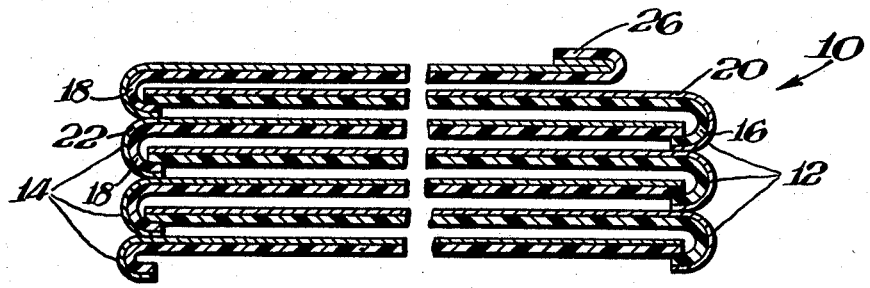
FIGURE 1 is a view in section of a portion of a convolute winding made in accordance with the invention.

In FIGURE 1, a portion 10 of a convolutely wound capacitive section is shown. Herein, a pair of metallized films 12 and 14 are convolutely wound together so that their dielectric layers 16 and 18 are interposed between their respective conductive surface coatings, 20 and 22.

In this construction, layers 16 and 18 may be any suitable dielectric; for example, a paper such as kraft paper or benares or a plastic such as polyesters, polycarbonates, polystyrenes, or the like. The conductive surfaces 20 and 22 which may be aluminum or the like, are metallized coatings which are deposited on the dielectric in any conventional manner, such as by vapor deposition, etc.

In the capacitor, films 14 and 16 are transversely disposed within the winding, with portions extended from alternate ends being folded back into the section. The conductive surface, or area, of each turn is provided on the outside of its fold, so as to contact the conductive surface of an adjoining turn of similar polarity, and the folded dielectric material, on the inside of the fold, encompasses the edge of an adjoining turn of opposite polarity.

Consequently, each turn of film 12 is folded around the edge of an adjoining turn of layer 14, and the dielectric layer 16 is on the inside of the fold so that it spaces its conductive surface 20 from surface 22 which is of opposite polarity.

On the other hand, film 14 is extended from and folded back into the other end of the section so as to encompass the edge of each adjoining turn of film 12. In this case, dielectric layer 18, which is on the inside of the fold, spaces its exposed electrode surface 22 from the enclosed conductive surface 20.

This provides large exposed areas of each electrode at alternate ends of the convolute section, while it insulates the adjoining electrode of opposite polarity. Furthermore, each folded end not only insulates and spaces both electrodes from each other at this point, but it also determines the transverse position of both electrodes in the section since each film is positioned against the inside of the fold.

Figure 2:
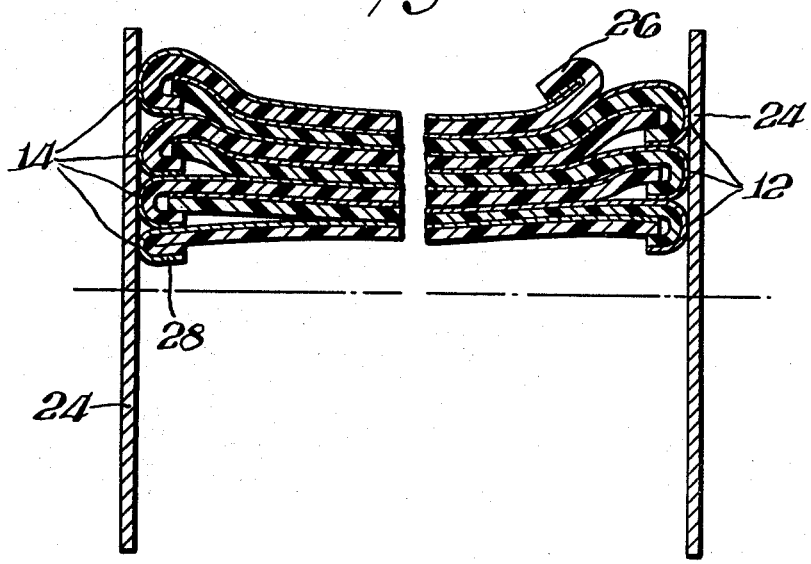
FIGURE 2 is a diagrammatic illustration in section of a capacitor constructed in accordance with the invention.

It should be understood, of course, that the ends of the convolute winding will generally be larger than the center portion and the section is not loosely wound, as shown for purposes of illustration in FIGURE 1, but is tightly wound as depicted in FIGURE 2.

In FIGURE 2, a large flat surface or disk 24 is pressed against the exposed conductive surfaces at end of the section to provide contact with the exposed electrode at each end. To complete the unit, it would be inserted within a sleeve or container (not shown) with contact ensured by a spring or elastic member which forces disks 24 against both ends of the section.

The use of these planar surfaces 24, for terminal connections, is made possible by the large exposed portion of the electrode and the fact that adjoining ends of electrodes of opposite polarity are spaced and insulated from each other by the folded dielectric. In this regard, prior art arrangements, where the folded end merely butts against the adjacent edge of opposite polarity, can become shorted when pressure is exerted against the folds.

Contact could also be made, however, by more conventional means, such as by spraying a conductive coating over both ends and joining these to a terminal wire, or the like. In any case, the construction provides suitable contacts of large area at each end of the section and suitably insulates the electrode of opposite polarity in this area.

Advantageously, the margins usually employed in extended foil sections are unnecessary in this arrangement, since one edge of each turn is enclosed by the dielectric of the adjoining turn, however, for added safety, a margin could still be employed on the unfolded edge. Furthermore, since the capacitor is not as susceptible to arcing and shorting, as a result of the unique construction, high voltage clearance of the capacitor is also unnecessary.

Winding of the capacitor is carried out in a conventional manner, but with the extended ends turned in. For example, strips 12 and 14 are fed to a mandrel with film 14 overlying film 12 and curled down over the edge of the latter along one edge. Then, as the layers are loosely wound together on the mandrel, layer 12 is curled over the edge of the adjoining previously formed turn of layer 14 to provide a structure as shown in FIGURES 1 and 2. In this case, each turn remains loose until the film of the following turn is bent and curled around its edge.

It should be understood, however, that depending upon the arrangement of the winding, the edge of either the first or the last film will not be enclosed. This, of course, could be detrimental as it would leave an exposed edge of opposite polarity at the wrong end of the capacitive section. However, this may be controlled in a number of ways.

For example, as shown in the figures, the edge of the last turn could be folded back, as at 26, to expose its dielectric layer. In this case film 14 utilizes its own dielecelectric layer 18 to insulate its electrode 22 from contact at this end of the section. Furthermore, a separate dielectric wrapper could be inserted before the last turn and curled over the indicated edge.

Advantageously the first turn, that is the centermost turn, is merely folded in as shown at 28 in FIGURE 2. In this construction, this turn will not encompass an edge of an adjoining turn.

The indicated winding process could be reversed. That is, layer 14 could be the centermost layer (adjacent the mandrel) in which case it would be folded up over the edge of overlying layer film 12 as they are fed to the mandrel and layer 12 would then be curled over the next succeeding turn, not a previously formed turn.

As indicated, various different techniques may be utilized to produce the described structure. Thus it will be understood, that the above-described embodiments of the invention are for purposes of illustration only and that modifications may be made without departing from the spirit and scope of the invention, and it is intended that this invention is to be limited only by the appended claims.

What is claimed is:

1. A metallized thin film capacitor in which a pair of dielectric films having a conductive surface on one side thereof are convolutely wound in capacitive relationship with the dielectric portion of each film interposed between their conductive surfaces, wherein the improvement comprises: each film being transversely disposed within the winding and extended from alternate ends thereof; the extended portions being folded back into the winding so as to encompass the edge of an adjacent turn of opposite polarity; each conductive surface being disposed on the outside of its respective fold so as to contact the conductive surface of an adjoining turn of the same polarity; and the dielectric material being disposed on the inside of its respective fold so as to space the folded back portion of the conductive surface from the encompassed conductive surface of opposite polarity.

2. A capacitor as claimed in claim 1 including a planar surface at each end of the winding in contact with the exposed conductive surfaces thereat and providing terminal connections thereto.

References Cited

UNITED STATES PATENTS 2,244,090   6/1941   Traub _____ 317—260

FOREIGN PATENTS 480,713   2/1938   Great Britain.

LARAMIE E. ASKIN, *Primary Examiner.*

E. GOLDBERG, *Assistant Examiner.*